United States Patent Office 3,098,854
Patented July 23, 1963

3,098,854
ACID ADDITION SALTS OF BASICALLY SUBSTITUTED FLAVONES AND PREPARATION THEREOF
Josef Klosa, Berlin-Zehlendorf, Germany, assignor to Dr. med. Hans Voigt Chem.-Pharm. Fabrik, Berlin-Waidmannslust, Germany
No Drawing. Filed Feb. 9, 1961, Ser. No. 88,015
Claims priority, application Germany Oct. 18, 1960
9 Claims. (Cl. 260—247.2)

This invention relates to therapeutically effective addition salts of basically substituted flavones and purine derivatives of acetic acid, and to the method of their preparation.

More particularly, the invention is concerned with addition salts of flavones basically substituted in the 7-position and acetic acid substituted by a xanthine ring system, which salts have the formula

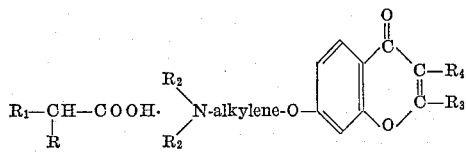

wherein R is hydrogen or lower alkyl, preferably alkyl containing from 1 to 4 carbon atoms, or aryl, $R_1$ is a xanthine ring system, $R_2$ is lower alkyl, preferably alkyl containing from 1 to 3 carbon atoms, or both $R_2$ groups are joined to form a heterocyclic nitrogen ring system, $R_3$ is lower alkyl, preferably alkyl containing from 1 to 2 carbon atoms, or aryl, and $R_4$ is hydrogen or lower alkyl, preferably alkyl containing from 1 to 2 carbon atoms.

The new salts of this invention possess good water solubility, favorable compatibility, and are about 2 to 3 times less toxic than the corresponding salts of these flavones prepared with mineral acids. Moreover, the pharmacodynamic activity of the new salts of this invention is in every instance greater than that of the mineral acid salts.

In the preparation of the novel salts of the present invention, flavones basically substituted in the 7-position, and in which the radicals $R_2$, $R_3$ and $R_4$ have the meaning indicated in the above formula, are converted into their acid addition salts by treatment with acetic acid substituted with a xanthine ring system. This conversion to the salts can take place merely by melting together the respective components. It can also be carried out by bringing the two components together in a solvent, such as water, or an organic solvent, e.g., a lower aliphatic alcohol, such as methyl, ethyl, or propyl alcohol.

Flavones basically substiuted in the 7-position which may be employed in preparing the novel salts of this invention include preferably those in which the substituent in the 7-position is a β-amino-alkoxy group, such as, for example, a β-amino-ethoxy group, in which the amino nitrogen is further substituted by lower alkyl groups containing from 1 to 3 carbon atoms, such as methyl, ethyl, or propyl groups. Moreover, the substituents on the amino nitrogen may be joined to form a heterocyclic nitrogen ring system, which may be a five or six membered ring, such as, for example, a morpholine, piperidine, or a pyrrolidine ring. Accordingly, the flavones basically substituted in the 7-position may be designated by the general formula

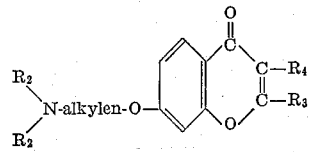

in which, when $R_2$ substituents join to form a heterocyclic ring system, said system, which will preferably be a saturated ring, may also contain additional substituents, such as lower alkyl groups and lower alkyl substituted phenyl groups. The substituents $R_3$ and $R_4$ may each be methyl or ethyl groups, while additionally $R_3$ may be aryl, advantageously phenyl or lower alkyl substituted phenyl.

The flavone components may be readily and conveniently prepared by the condensation of 7-β-halo-ethoxy-flavones with a suitable secondary nitrogen base, such as, for example, dimethylamine, diethylamine, morpholine, piperidine, pyrrolidine, and the like. The condensation can be effected in a solvent medium or directly without the aid of a solvent. The presence of alkali metal iodides or bromides serves to accelerate the reaction. The preparation of the flavones is described in copending application Serial No. 63,499, filed October 19, 1960. Examples of suitable flavone derivatives include 7-(ω-N-dialkylaminoalkoxy)-flavones, such as 7-(β-N-dimethylaminoethoxy)-flavone
7-(β-N-diethylaminoethoxy)-flavone
7-(β-N-dipropylaminoethoxy)-flavone
7-(β-N-dibutylaminoethoxy)-flavone
7-(γ-N-dimethlaminopropoxy)-flavone as well as closed ring compounds, such as 7-(β-N-morpholinoethoxy)-flavone
7-(β-N-piperidinoethoxy)-flavone
7-(β-N-pyrrolidinoethoxy)-flavone Purine derivatives of acetic acid which are employed to form the addition salts of the invention are advantageously compounds in which acetic acid is substituted by a xanthine ring system, such as, for example, a xanthine (2,6-dioxopurine) ring, a theophyllin (1,3-dimethylxanthine) ring system, or a theobromine (3,7-dimethylxanthine) ring system. Examples of such substituted acetic acids include xanthine-acetic acid, theophyllin-7-acetic acid, theophyllin-7-(α-phenyl)-acetic acid, theobromine-1-acetic acid, and the like.

The new salts are useful for the treatment of heart in human beings, especially by reason of their extraordinary vasodilator action, which renders all these compounds particularly effective as agents for the treatment of angina pectoris. Thus, for example, the compound theophyllin-7-acetic acid-7-(β-N-dimethylaminoethoxy)-flavone in dosages of 15–45 mg. per day acts as a preventive in angina pectoris cases. The vasodilator action of the new compounds is about 7 times greater than that of glyceryl trinitrate, and is about equal to that of amyl nitrite. Their action does not develop immediately upon oral administration, but develops fully after an interval of one to three days of treatment. The advantage of the new compounds of the invention over the aforementioned nitro compounds lies in a much longer period of action, a less fleeting activity, and in a considerably more favorable ratio between the therapeutic dose and the toxic dose. Furthermore, the new compound are free from undesirable effects of the nitro compounds, such as brain pressures and headaches.

The superiority in pharmacodynamic activity displayed by the new salts of this invention is demonstrated in the following table, showing comparisons in regard to median lethal dosage ($LD_{50}$) in mice, coronary dilation, peripheral blood vessel action, and musculotropic spasmolysis.

TABLE 1

| Preparation | $LD_{50}$ in mg./kg. per mouse | Coronary dilation | Peripheral blood vessel action | Musculotropic spasmolysis |
|---|---|---|---|---|
| Theophyllin/papaverin | | 1 | 1 | 1 |
| 7-($\beta$-N-dimethyl-aminoethoxy)-flavone hydrochloride | 400 | 4 | 3 | 0.5 |
| 7-($\beta$-N-dimethyl-aminoethoxy)-flavone salt of theophyllin-7-acetic acid | 1,750 | 9 | 8 | 0.8 |
| 7-($\beta$-N-dimethyl-aminoethoxy)-flavone salt of theobromine-1-acetic acid | 1,120 | 7 | 10 | 0.9 |

Papaverin served as a control substance for demonstrating musculotropic spasmolytic action, wherein the value 1 was assigned to papaverin. Theophyllin was used for the control substance and was assigned the value 1 for coronary dilation and for peripheral blood vessel action, in the above table. The determination of coronary dilation was carried out according to known methods on isolated guinea pig hearts, the blood vessel action determination on isolated perfused rabbit ears, and the musculotropic spasmolytic action on isolated guinea pig intestine. Table 1 clearly shows the superiority of the new salts with respect to greatly lowered toxicity in comparison with the mineral acid salt, as well as in regard to the other mentioned properties.

The newly prepared salts possess a combination of favorable pharmacodynamic and physical properties. Thus, for example, the free base 7-($\beta$-N-dimethylaminoethoxy)-flavone is insoluble in water, while theophyllin-7-acetic acid is difficultly soluble in water. However, if a mixture of the two substances is treated with water, solution takes place with formation of the readily soluble salt. Thus, the solution of the mixture of components exhibits the same favorable pharmacodynamic properties as the salt would if it were isolated. This is shown in the following example:

7-($\beta$-N-dimethylaminoethoxy)-flavone is insoluble in water in the form of the free base. Theobromine-1-acetic acid is difficultly soluble in water. If both components are mixed together in molar proportions, and then treated with 2 to 3 times their amount of water, solution takes place after a short time. Upon evaporating this solution on the water bath there is obtained the theobromine-1-acetic acid addition salt of 7-($\beta$-N-dimethylaminoethoxy)-flavone, having a melting point of 195–197° C. The free base can be completely precipitated from the aqueous solution by the addition of a weak alkali, such as soda. Upon addition of acid, the theobromine-1-acetic acid precipitates.

The aqueous solutions of the new salts of this invention exhibit pH values ranging from about 7.0 to 7.2.

Efforts to obtain salts of these basically substituted flavones having the same favorable properties, with other organic acids, such as, for example, theophyllin, ascorbic acid, nicotinic acid, or even flavone-7-oxyacetic acid, met with failure. These salts either were not formed at all, or proved to be hygroscopic, such as the salt of flavone-7-acetic acid, or were insoluble in water. Moreover, no improvement over the pharmacodynamic properties of the new salts of this invention was discernible. It was therefore surprising and unexpected that the xanthinering-substituted acetic acid salts of this invention should possess this favorable combination of pharmacodynamic and physical properties.

The following examples serve further to illustrate the present invention, but it is to be understood that the invention is not to be regarded as limited thereby.

*Example 1*

30.9 g. of 7-($\beta$-N-dimethylaminoethoxy)-flavone were dissolved in 200 ml. of 96% alcohol. Into this solution there were introduced 25 g. of finely powdered theobromine-1-acetic acid. The theobromine-1-acetic acid dissolved at once. After heating, there was precipitated within the first 20 minutes a crystalline mass of tiny colorless needles. This crystal mass redissolves at the boiling temperature of the alcohol. The mixture is boiled for 30 minutes, filtered if necessary, and allowed to cool. Within 1 to 2 hours the new salt crystallizes out completely. It can be recrystallized from alcohol. Yield is 50 to 52 g. Another 3 to 4 g. of salt can be obtained by evaporation of the mother liquor.

*Example 2*

30.9 g. of 7-($\beta$-N-dimethylaminoethoxy)-flavone are heated briefly with 25 g. of theophyllin-7-acetic acid in 300 to 400 ml. of water until solution occurs, whereupon the water is evaporated in a dish on the steam bath or under vacuum. The crystalline residue is dissolved in a small amount of alcohol, or if desired in 60–70% alcohol, to form beautiful colorless needles, melting point 228–230° C. Yield was about 90%.

*Example 3*

7-($\beta$-N-dimethylaminoethoxy)-flavone salt of theophyllin-7-acetic acid was obtained by melting together 30.9 g. of 7-($\beta$-N-dimethylaminoethoxy)-flavone with 52 g. of theophyllin-7-acetic acid for 10 to 15 minutes. The melt was boiled with a small amount of alcohol. There were obtained colorless micro-crystalline needles, melting point 228–230° C., yield about 93%.

*Example 4*

The 7-($\beta$-N-dimethylaminoethoxy)-flavone salt of theophyllin-7-($\alpha$-phenyl)-acetic acid, having a melting point of 210–212° C. was obtained by heating together approximately molar ratios of 7-($\beta$-N-dimethylaminoethoxy)-flavone and theophyllin-7-($\alpha$-phenyl)-acetic acid as described in Example 3; yield about 90%.

*Example 5*

The 7-($\beta$-N-morpholinoethoxy)-flavone salt of theophyllin-7-acetic acid, having a melting point of 170–172° C., was obtained by heating together in approximately molar ratios 7-($\beta$-N-morpholinoethoxy)-flavone and theophyllin-7-acetic acid in 80% ethyl alcohol, evaporating the solution in vacuo, and boiling up the residue with isopropyl alcohol. The new salt crystallizes in colorless crystals; yield about 90%.

*Example 6*

The 7-($\beta$-N-piperidinoethoxy)-flavone salt of theophyllin-7-acetic acid, having a melting point of 160–162° C. was obtained by heating together in approximately molar ratios 7-($\beta$-N-piperidinoethoxy)-flavone and theophyllin-7-acetic acid in 95% ethyl alcohol. After several hours' digestion, colorless crystals appear; yield about 90%.

*Example 7*

The 7-($\beta$-N-diethylaminoethoxy)-flavone salt of theophyllin-7-acetic acid, having a melting point of 108–110° C. was obtained by 30 minutes of boiling of 7-($\beta$-N-diethylaminoethoxy)-flavone and theophyllin-7-acetic acid in molar ratio, filtering, evaporating to half volume in vacuo, and allowed to stand for several hours to crystallize; yield about 90%.

Example 8

The 7-(β-N-pyrrolidinoethoxy)-flavone salt of theophyllin-7-acetic acid was obtained in the form of an aqueous solution by boiling 2.3 g. of theophyllin-7-acetic acid with 3.7 g. of 7-(β-N-pyrrolidinoethoxy)-flavone in 30 ml. water for 20 minutes. The solution is filtered hot. It is stable, can be diluted to any desired extent, and can be used therapeutically in drop form or in ampules. The solution of the salt of 7-(β-N-dibutylaminoethoxy)-flavone and theophyllin-7-acetic acid is prepared analogously.

Example 9

The 7-(γ-N-dimethylaminopropoxy)-flavone salt of theophyllin-7-acetic acid was prepared by dissolving 3.2 g. of 7-(γ-N-dimethylaminopropoxy)-flavone in 25–30 ml. of methanol. To this solution there was added 2.4 g. of theophyllin-7-acetic acid, and the solution boiled for 30 minutes until solution took place. The solution was then evaporated in vacuo, whereupon the salt crystallized out, melting point 182–184° C., yield 90%. It can be recrystallized from a little methanol or ethanol and is very slightly soluble in water.

It will be understood that the above description of the present invention is susceptible to various modifications, changes and adaptations, and the same are intended to be comprehended within the meaning and range of equivalents of the appended claims.

I claim:
1. Acid addition salts of flavones basically substituted in the 7-position and of xanthine ring derivatives of acetic acid, said salts having the formula

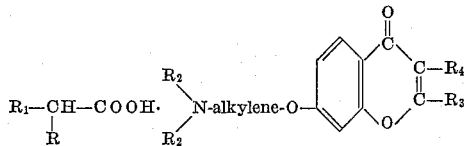

wherein R is a member selected from the group consisting of hydrogen, lower alkyl and phenyl, $R_1$ is a xanthine ring system selected from the group consisting of xanthine, theophyllin and theobromine, $R_2$ is a member selected from the group consisting of lower alkyl and together with the nitrogen atom forming a member selected from the group consisting of pyrrolidino, piperidino and morpholino, $R_3$ is a member selected from the group consisting of lower alkyl, phenyl and lower alkyl phenyl, and $R_4$ is a member selected from the group consisting of hydrogen and lower alkyl.

2. The acid addition salts of claim 1 wherein R is hydrogen, $R_1$ is theophyllin, $R_2$ is methyl, $R_3$ is phenyl, and $R_4$ is hydrogen.

3. The acid addition salts of claim 1 wherein R is hydrogen, $R_1$ is xanthine, $R_2$ is methyl, $R_3$ is phenyl, and $R_4$ is hydrogen.

4. The acid addition salts of claim 1 wherein R is hydrogen, $R_1$ is theobromine, $R_2$ is methyl, $R_3$ is phenyl, and $R_4$ is hydrogen.

5. The acid addition salt of theophyllin-7-acetic acid and 7-(β-N-dimethylaminoethoxy)-flavone.

6. The acid addition salt of theobromine-1-acetic acid and 7-(β-N-dimethylaminoethoxy)-flavone.

7. The acid addition salt of theophyllin-7-acetic acid and 7-(β-N-morpholinoethoxy)-flavone.

8. The acid addition salt of theophyllin-7-acetic acid and 7-(β-N-piperidinoethoxy)-flavone.

9. The acid addition salt of theophyllin-7-acetic acid and 7-(β-N-pyrrolidinoethoxy)-flavone.

References Cited in the file of this patent

FOREIGN PATENTS 1,054,091    Germany _____ Apr. 2, 1959

OTHER REFERENCES

Anselmi: "Boll. Chim. Farm," volume 94, pp. 443–50 (1955).

Serchi et al.: "Chimica" (Milan), volume 12, pp. 375–385, (1956).

Primavori et al.: "Chimica" (Milan), volume 33, pp. 91–5 (1957).

Serchi et al.: "Chimica" (Milan), volume 34, pp. 58–61 (1958).